United States Patent [19]

Fogle et al.

[11] 4,175,161

[45] Nov. 20, 1979

[54] METHOD OF IMPROVING THE ADHESION OF A HEAT ACTIVATABLE POLYURETHANE ADHESIVE TO A VINYL SUBSTRATE

[75] Inventors: Ozzie Fogle; James Cooley, both of Orangeburg, S.C.

[73] Assignee: Champion International Corporation, Stamford, Conn.

[21] Appl. No.: 901,014

[22] Filed: Apr. 27, 1978

[51] Int. Cl.² .................... B32B 27/40; B32B 27/30; B32B 27/18
[52] U.S. Cl. ................................ 428/425; 156/305; 156/331; 428/424; 428/500
[58] Field of Search .......................... 428/423–425, 428/500; 156/331, 305, 310

[56] References Cited

U.S. PATENT DOCUMENTS

| | | | |
|---|---|---|---|
| 2,891,876 | 6/1959 | Brown et al. | 428/425 X |
| 3,004,945 | 10/1961 | Farago | 260/30.2 X |
| 3,043,794 | 7/1962 | Feiler et al. | 156/331 X |
| 3,252,819 | 5/1966 | Cobb | 260/30.2 X |
| 3,432,456 | 3/1969 | Oertel et al. | 260/30.2 |
| 3,437,622 | 4/1969 | Dahl | 428/425 X |
| 3,468,771 | 9/1969 | Pedlow | 428/425 X |
| 3,538,055 | 11/1970 | Camiller et al. | 428/424 X |
| 3,589,929 | 6/1971 | Smolder et al. | 428/260 |
| 3,809,603 | 5/1974 | Kool et al. | 428/425 X |
| 3,827,927 | 8/1974 | Lubowitz | 260/30.2 X |
| 4,119,094 | 10/1978 | Micklus et al. | 428/425 X |

Primary Examiner—Harold Ansher
Attorney, Agent, or Firm—Evelyn M. Sommer

[57] ABSTRACT

The adhesion of a heat activatable polyurethane adhesive to a vinyl substrate is improved by admixing the adhesive with an N-substituted-2-pyrrolidone and/or an ethoxylated alkyl phenol.

10 Claims, No Drawings

METHOD OF IMPROVING THE ADHESION OF A HEAT ACTIVATABLE POLYURETHANE ADHESIVE TO A VINYL SUBSTRATE

BACKGROUND OF THE INVENTION

In the manufacture of a large number of industrial products, a vinyl substrate such as vinyl film is adhered or laminated to a great variety of substrates. In hot laminating processes, the vinyl substrate and the other ply or plies are adhered through the use of a suitable adhesive at elevated temperatures. Polyurethane adhesives have been used in such hot laminating processes but difficulties have been encountered. Plasticizers in the vinyl compositions migrate at elevated temperatures, the silicone coatings typically found on the vinyl substrates interfere with adhesion and production variations between the vinyl and the adhesive also interfere with adhesion.

It has now been found that the addition of certain agents to heat activatable polyurethane adhesives overcome the past difficulties and excellent adhesion to vinyl films can be achieved.

Accordingly, it is the object of this invention to provide a new method of improving the adhesion of a heat activatable polyurethane adhesive to a vinyl substrate thereby achieving improved laminated articles and to such new laminated articles. This and other objects of the invention will become apparent to those skilled in this art from the following detailed description.

SUMMARY OF THE INVENTION

This invention relates to a method of improving the adhesion of a heat activatable polyurethane adhesive to a vinyl substrate and to the laminated articles which can be achieved thereby.

The improvement is realized by adding an N-substituted-2-pyrrolidone and/or ethoxylated alkyl phenol to the heat activatable polyurethane adhesive and reacting any free agent after application of the adhesive to the vinyl substrate with an organic isocyanate.

DESCRIPTION OF THE INVENTION

The vinyl substrates which are adhered in this invention are the usual vinyl materials such as, for example, polyvinyl chloride, polyvinylidene chloride, vinyl chloride-vinyl acetate copolymers, and the like which can contain the conventional additives such as plasticizers. The present invention is particularly useful with vinyl substrates in the form of thin films such as those having a thickness of about 0.5-20 mils. The other substrate materials to which such vinyl substrates can be adhered include a wide variety of materials such as polymeric compositions exemplified by polyethylene, polypropylene, polystyrene, polyesters, epoxy resins, natural or synthetic rubber, metals such as steel, copper, brass, and the like, cellulosic materials such as wood and wood products, cardboard and paper goods, and the like, and, of course, vinyl substrates.

The heat activatable polyurethane adhesives which are in the instant process are well known in the art and do not require any detailed description here. Broadly speaking, such adhesives are reaction products of an organic polyisocyanate such as hexamethylene diisocyanate, toluene diisocyanate, diphenyl diisocyanate, tetramethylene diisocyanate, toluene triisocyanate, triphenylmethyl triisocyanate, polyaryl polyisocyanate and the like, with an active hydrogen-containing compounds such as those containing hydroxyl and/or amino groups exemplified by glycols, polyols, hydroxylated polyesters, diamines and the like.

The adhesion promoting agents of the present invention are N-substituted-2-pyrrolidones and ethoxylated alkyl phenols. The N-substituent of the pyrrolidones can be a lower alkyl or lower alkenyl group containing 1 to about 4 carbon atoms such as methyl, ethyl, propyl, and vinyl radicals. The pyrrolidone selected for use herein is required to be a clear liquid having a viscosity in the range of about 1.4 cps.

The alkyl phenols which are ethoxylated are phenols containing 1 to 3 alkyl groups having 1 to about 18 carbon atoms in each alkyl group. When ethoxylated to the desired degree, the resulting material is usually a clear liquid having a viscosity of the range of about 1.0-5.0 centipoises. A preferred compound is OD-410 manufactured by GAF (ethoxylated alkyl phenol).

It has been found that the pyrrolidone and ethoxylated alkyl phenols act as cleaning and bonding materials on the vinyl substrates permitting better contact of the polyurethane adhesive to the surface thereof.

In general, an amount of pyrrolidone in the range of about 1-15% by volume, and preferably about 3-10% by volume has been found to be useful. The amount of the ethoxylated alkyl phenol which has been found appropriate is about 1-15% by weight and preferably about 4-10% by weight. Various mixtures of pyrrolidones, ethoxylated alkyl phenols, and pyrrolidones and ethoxylated alkyl phenols can be used.

After the additive has served its function of permitting better contact between the vinyl substrate and the heat activatable polyurethane adhesive, it should be eliminated as an active material because of its potential to cause problems as time progresses. This can be accomplished by reacting the additive with an organic isocyanate. Any of the organic polyisocyanates mentioned above in connection with the heat activatable polyurethane adhesive can be used for this purpose. It is presently preferred to use polymethylene polyphenyl isocyanates for this purpose. The amount of isocyanate material will vary depending on the amount of additive originally employed and is preferably used in an amount as close as possible to that sufficient to react with any of the additive remaining in the heat activatable polyurethane adhesive. Amounts of polymethylene polyphenyl isocyanate in the range of about 1-4% by weight have been found to be appropriate for this purpose.

In order to realize the reaction of the organic isocyanate with the additive after the additive has served its function in connection with the vinyl substrate, one convenient method is to coat the substrate with two adhesive layers, a layer to contact the vinyl substrate containing the additive and all other layers containing the organic isocyanate. When the polyurethane adhesive is heated to activation temperatures the reaction of the organic isocyanate with the additive is sufficiently delayed to permit the additive to improve adhesion between the adhesive and the vinyl substrate.

In order to further illustrate the present invention, the following examples are set forth. Unless otherwise indicated, throughout this specification and claims all parts and percentages have been by weight and all temperatures in degrees Centigrade.

SYSTEM 1

Industrial particleboard was laminated using a polyurethane adhesive from National Starch with the addition of 3% by volume of GAF's n-methyl-2-pyrrolidone and 3% by volume of pappi (i.e. polymethylene polyphenyl isocyanate). The resulting adhesive was used in a hot line reactivated system to laminate a 6 mil vinyl film from Borden Chemical.

SYSTEM 2

Industrial particleboard was laminated using a polyurethane adhesive from National Starch with the addition of 3% by volume of GAF's OD-410 (ethoxylated alkyl phenol) and 3% by volume of pappi (i.e. polymethylene polyphenyl isocyanate). The resulting adhesive was used in a hot line reactivated system to laminate a 6 mil vinyl film from Borden Chemical.

In both systems the modified adhesive adhered the vinyl to the particleboard while the adhesive without the pyrrolidone or OD-410 did not adhere the vinyl to the particleboard. Various changes and modifications can be made in the present inventions without departing from the spirit and scope thereof. The various embodiments set forth herein were for the purpose of further illustrating the invention but were not intended to limit it.

What is claimed is:

1. A method of improving the adhesion of a heat activatable polyurethane adhesive to a vinyl substrate comprising admixing said heat activatable polyurethane adhesive with at least one agent selected from the groups consisting of N-substituted-2-pyrrolidone and ethoxylated alkyl phenol, wherein said N-substituted-2-pyrrolidone substituent is lower alkyl or lower alkenyl, applying said admixture to a vinyl substrate, and thereafter reacting an organic isocyanate with the additive in said heat activatable polyurethane adhesive.

2. The method of claim 1 wherein said pyrrolidone is employed in an amount of about 1–15% by volume.

3. The method of claim 2 wherein said amount is about 3–10% by volume.

4. The method of claim 1 wherein said ethoxylated alkyl phenol is used in an amount of about 1–15% by weight.

5. The method of claim 4 wherein said amount is about 4–10% by weight.

6. The method of claim 1 wherein said organic isocyanate is polymethylene polyphenyl isocyanate.

7. The method of claim 6 wherein said isocyanate is used in an amount of about 1–4% by weight based on the weight of the heat activatable polyurethane adhesive.

8. The method of claim 1 wherein said agent is N-methyl-2-pyrrolidone.

9. The method of claim 1 wherein said agent is N-vinyl-2-pyrrolidone.

10. A laminate produced by the method of claim 1.

* * * * *